United States Patent [19]
Freimanis

[11] 3,752,924
[45] Aug. 14, 1973

[54] TELEPHONE SUBSCRIBER LINE RING-TRIP DETECTION CIRCUIT

[75] Inventor: Laimons Freimanis, Chicago, Ill.

[73] Assignee: Bell Telephone Laboratories, Incorporated, Murray Hill, N.J.

[22] Filed: Nov. 10, 1971

[21] Appl. No.: 197,471

[52] U.S. Cl. .......... 179/84 R, 179/18 HB
[51] Int. Cl. .......... H04m 19/02
[58] Field of Search .......... 179/18 HB, 18 F, 179/18 FA, 18 FC, 18 GF, 84 T, 84 VF, 84 R, 84 A

[56] References Cited

UNITED STATES PATENTS

| | | | |
|---|---|---|---|
| 3,601,547 | 8/1971 | Potter | 179/18 HB |
| 3,492,436 | 1/1970 | Feiner et al. | 179/18 HB |
| 3,321,583 | 5/1967 | Maul | 179/18 FA |
| 2,846,513 | 8/1958 | Van Mierlo et al. | 179/18 HB |
| 2,796,465 | 6/1957 | Reenstra | 179/18 F |

*Primary Examiner*—Kathleen H. Claffy
*Assistant Examiner*—Randall P. Myers
*Attorney*—W. L. Keefauver et al.

[57] ABSTRACT

A ring-trip detection circuit arrangement for telephone system subscriber lines in which a relatively small number of detection circuits serve a large number of subscriber lines. Intended to overcome one of the problems presented by the inability of the transformer-coupled switching network to pass direct current, the invention provides for the assignment of the detector circuits to called lines by means of an auxiliary concentrator network. The necessity of providing the circuits on a per-line basis is eliminated.

12 Claims, 1 Drawing Figure

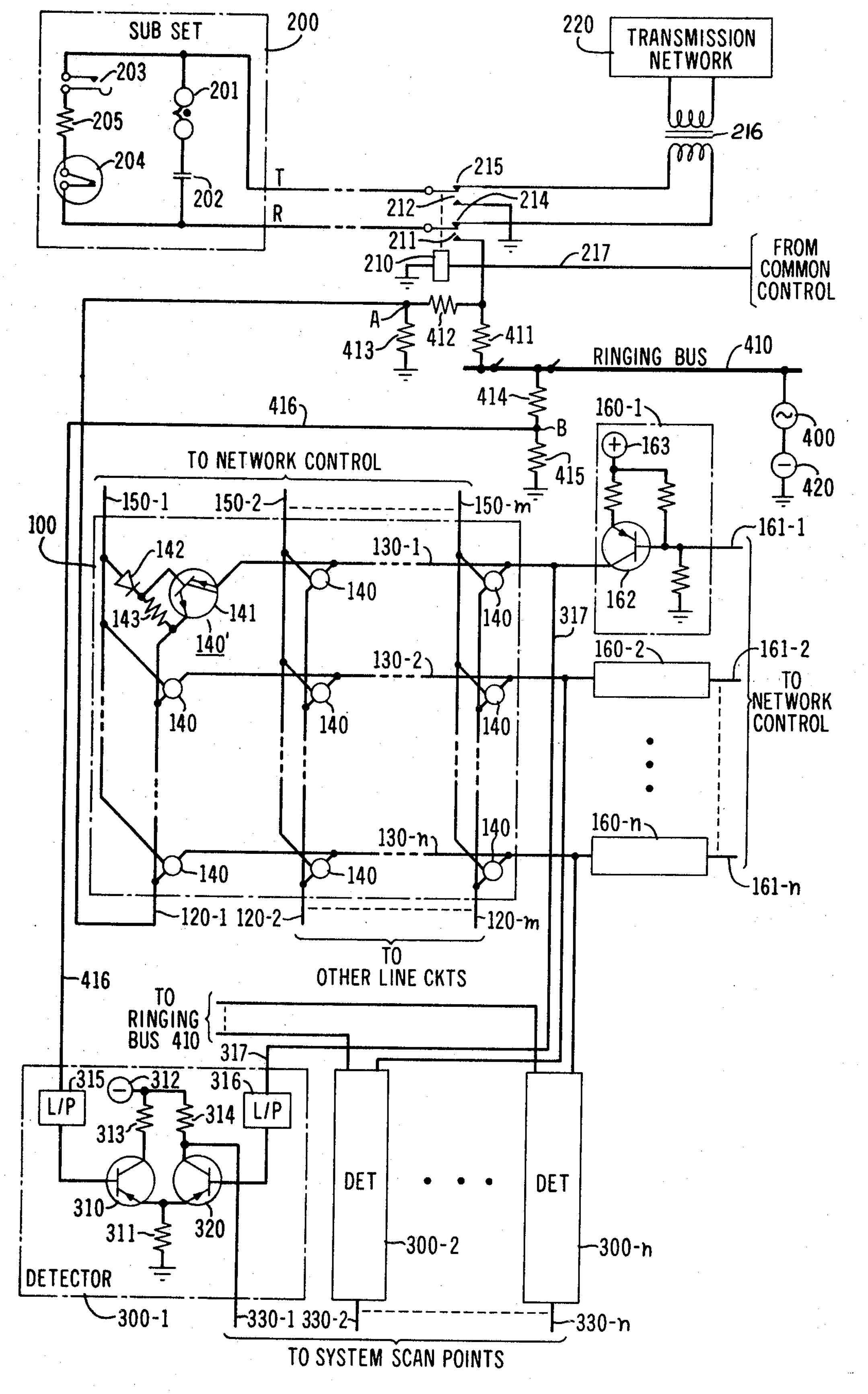
SUB SET
200
203
201
205
204
202
T
R
220
TRANSMISSION NETWORK
216
215
212
214
211
210
217
FROM COMMON CONTROL
A
412
411
413
RINGING BUS
410
414
B
415
416
400
420
160-1
163
162
161-1
TO NETWORK CONTROL
150-1
150-2
150-m
100
142
143
141
140'
140
130-1
130-2
130-n
317
160-2
161-2
TO NETWORK CONTROL
160-n
161-n
120-1
120-2
120-m
TO OTHER LINE CKTS
416
TO RINGING BUS 410
317
315
312
316
L/P
313
314
310
311
320
DET
300-2
300-n
DETECTOR
300-1
330-1
330-2
330-n
TO SYSTEM SCAN POINTS

TELEPHONE SUBSCRIBER LINE RING-TRIP DETECTION CIRCUIT

BACKGROUND OF THE INVENTION

This invention relates to supervisory circuits for telephone switching systems and particularly to such circuits adapted to detect subscriber response to ringing signals in systems employing semiconductor switching networks.

Telephone switching systems, including the more recent electronic systems, have in the past generally employed space division networks through which transmission paths are selectively established by means of metallic contact crosspoints. To date these crosspoints have proven satisfactory from the standpoints of reliability and low contact resistance. Metallic crosspoints have also been readily capable of transmitting the relatively high voltage, low frequency ringing signals through the switching network to the subscriber lines and, important for the context of the present invention, have also readily carried the direct current present in the subscriber line upon closure of the subset hookswitch. In recent years the demand for faster response time for network crosspoints as well as the advantages of circuit integration have turned the attention in the art from metallic contact relays to semiconductor switching devices as possible crosspoint elements. These elements such as PNPN thyristors, for example, have shown considerable promise and offer significant advantages over metallic crosspoints from the standpoints of size, speed of operation, and cost. Other properties have, however, limited their application and in the present state of the semiconductor art, specific problems must be overcome before solid state crosspoints find general acceptance in large-scale telephone switching networks.

Although other coupling arrangements are known, in systems where balanced networks are employed, the subscriber lines are conventionally transformer-coupled to the solid state network terminals. This is done for isolation purposes and to achieve the required longitudinal balance. Additionally, a center-tapped coupling transformer provides a means for applying holding current for the active crosspoints. As suggested in the foregoing this transformer coupling, conventionally designed to pass primarily voice frequencies down to 200 Hz, presents one of the limitations imposed by a thyristor crosspoint network, i.e., the inability of the coupling transformers to transmit a direct current. This problem is particularly pressing in connection with the detection of a subscriber line off-hook answer condition in response to a ringing signal. The problem is aggravated when stringent requirements are imposed to accomplish a ring-trip operation with minimum delay, in some cases, within 100 milliseconds, to preclude application of the ringing signal to the subscriber receiver during a typical 2-second ringing cycle. Without such a ring-trip arrangement, a called party, after raising the receiver, could be subjected to a ringing signal for up to the 2-second period which is particularly irritating, for example, to an operator routinely wearing a headset.

In known solid state network systems not able to sense through the network the typical negative 48 volt off-hook state, means have been employed on a per-line basis for the detection of subscriber response. Thus, one system provides a ring-trip relay which, although not responding to the 86 volt alternating current ringing signal, is operated by the 48 volt off-hook state. In effect, a mechanical low-pass filter is provided to accomplish the ring-trip function. Manifestly, the costs of providing individual subscriber line ring-trip circuitry are substantial and tend to mount as stricter design margins are imposed in order to guarantee maximum reliability in detecting subscriber call signals and minimum delay in system response. It will thus be appreciated that any reduction in these costs will serve to enhance interest in a transformer-coupled solid state switching network as an attractive replacement for prior art metallic contact networks.

Accordingly, it is an object of this invention to provide a more economical subscriber line ring-trip detection arrangement for transformer-coupled telephone system switching networks.

It is another object of this invention to reduce the number of ring-trip detection circuits necessary to serve a given number of telephone system subscriber lines.

Also an object of this invention is a new and improved supervisory circuit organization for detecting subscriber response to ringing signals in solid state network telephone switching systems.

It is a further object of this invention to provide a new and novel supervisory circuit arrangement for detecting direct current in a telephone system subscriber line.

SUMMARY OF THE INVENTION

The foregoing and other objects of this invention are realized in one illustrative embodiment thereof in which a thyristor crosspoint concentrator provides for the sharing of the ring-trip detection circuitry by a number of subscriber lines. Advantageously, the concentrator crosspoints are identical in circuit detail to those employed in the system transmission switching network. Where the latter network, however, is transformer-coupled to the subscriber lines, the concentrator network is directly coupled to those lines and to its own output circuitry and thus suffers from none of the disabilities of transformer coupling.

In one exemplary organization according to this invention, on an assumed traffic, for example, that in a given telephone system only 10 out of a 1000 lines will be rung at any one time, a direct current coupled thyristor crosspoint network concentrator controls, under instructions from the system central control, the assignment of one of 10 shared detector circuits to each line of the 1,000 being rung. The input terminals of the concentrator matrix connect between the subscriber lines and the telephone system ringing bus, the output terminals being connected to the ringing bus via the specific detector circuit. The latter circuit examines the alternating current ringing signals for two conditions: whether or not they are shifted from a predetermined reference voltage level. If the hookswitch at the subscriber subset is closed, indicating called party response, the reference level shift of the ringing signals is detected by a suitable comparator comprising the actual detector circuit. The shift is signaled, by means of suitable system scanner, to the central control of the telephone system which in turn operates to transfer the called line from the ringing bus to the system transmission network.

According to one feature of this invention, a concentration based on traffic as assumed in the foregoing example would result in a 99 percent reduction in the number of ring-trip detection circuits required to serve the subscriber lines. The reliability of solid state networks coupled with a marked reduction in operating circuits thus in turn contribute to reduced maintenance and longer system life. With the economies thus achieved, additional attention can also be afforded on the detection circuits themselves to ensure adherence to however rigorous the operational margins may be imposed.

BRIEF DESCRIPTION OF THE DRAWING

The organization and operation of this invention together with its objects and features will be better understood from a consideration of the detailed description of one illustrative embodiment thereof which follows when taken in conjunction with the accompanying drawing, the single FIGURE of which depicts schematically a single representative subscriber line associated with a solid state ring-trip concentrator network.

DETAILED DESCRIPTION

An illustrative telephone subscriber line ring-trip detection arrangement embodying the principles of this invention is shown in the drawing and comprises a concentrator network 100 adapted to establish a transmission path between any one of a plurality of subscriber line subsets, such as a representative subset 200, and any one of a plurality of ring-trip detector circuits 300-1 through 300-n during the application to the subset 200 of ringing signals. The latter signals originate at a ringing current generator 400 connected between a central office ringing current bus 410 and a conventional negative 48 volt source 420. The ringing signals, which may typically comprise a 20 Hz, 86 volt alternating current, are selectively applied to a subscriber line under the control of a ringing relay 210 operated under instructions from the system common control such as a central processor in electronic systems.

The ringing bus 410 is multipled to all of the lines of the central office and is connected to any selected line via make contacts 211 and 212 of relay 210 and a protection resistor 411. The subscriber subset, conventionally comprising a ringer 201 and direct current blocking capacitor 202 serially connected in parallel with hookswitch contacts 203 and, in many installations, dial contacts 204, is extended from the central office via tip and ring conductors and at the latter point to the transmission network 220 of the system via normally closed break contacts 214 and 215 of relay 210. Although a detailed description of the transmission network 220 is not considered necessary for a complete understanding of this invention and is therefore not shown, a transformer 216 is contemplated as coupling the tip and ring conductors to the network. This is in accord with the direct current blocking problem to which this invention is directed. The details of a transmission network such as the network 220 are well known in the art and may conform substantially to those of the concentrator network 100 to be described. It will be appreciated, on the other hand, that the ring-trip detection circuit of this invention will find application in any telephone switching context where the subscriber lines are coupled to the network by means precluding the passage of direct current whether the network has solid state or metallic contact crosspoints.

The concentrator network 100 comprises a coordinate array of *m* input conductors 120 and *n* output conductors 130, arranged vertically and horizontally as viewed in the drawing. The network constitutes, when called into service by the system common control, a selective link in a bridge also including a detector circuit 300, connected between the taps of two voltage divider circuits extending from the ringing bus 410. The first voltage divider comprises the resistor 411, normally provided to protect the common ringing source 400 against false grounds in the subscriber lines, and a pair of resistors 412 and 413, the three resistors being serially connected between bus 410 and ground. A line circuit input 120-1 of the network 100 is permanently connected to a tap of the divider between the resistors 412 and 413. As will appear more fully hereinafter, each of the remaining inputs 120-2 through 120-m is also connected via an identical voltage divider with the bus 410. The other voltage divider of the pair comprises resistors 414 and 415 serially connected between bus 410 and ground.

The completing link in the connecting bridge referred to in the foregoing is made up of one of the ring-trip detectors, in the illustrative embodiment shown, the detector 300-1, an input of which is connected between the resistors 414 and 415 via a conductor 416. Each of the remaining detectors 300-2 through 300-n is also connected via an identical voltage divider with the bus 410. Each of the detectors 300 functions as a comparator circuit the details of which are shown in connection with detector 300-1 as comprising a pair of PNP transistors 310 and 320 having their emitters connected to ground through a resistor 311 and their collectors individually connected to a source of negative potential 312 through resistors 313 and 314. The bases of transistors 310 and 320 provide the inputs to detector 300-1, each being made through a respective low-pass filter 315 and 316. Each of the latter may comprise an RC circuit well known in the art. Specifically, the base input of transistor 310 of representative detector 300-1 is connected via filter 315 and conductor 416 to the center tap between resistors 414 and 415. The base input of the other transistor 320 is connected via filter 316 to a coordinate output conductor 130-1 of output conductors 130-1 through 130-n of concentrator network 100 extended thereto via conductor 317. Outputs of the detectors 300 are taken from the collectors of the respective transistors 320 and are made available to the telephone system scanpoints via a plurality of output conductors 330-1 through 330-n.

The cencentrator network 100 advantageously comprises, as mentioned previously, a network made up of solid state crosspoints organized substantially identically to that of the solid state transmission network with which a telephone system may also be provided. Thus, the network 100 comprises a plurality of vertical conductors 120-1 through 120-m and a plurality of horizontal conductors 130-1 through 130-n, already noted. A plurality of solid state crosspoint devices 140 are provided at the intersections of the horizontal and vertical conductors for connecting each of the former to each of the latter. The circuit organization of each of the crosspoint devices 140 is well known in the art and comprises, as shown in detail in connection with representative crosspoint 140', a PNPN transistor (thyristor) 141 having its anode and cathode connected between a horizontal and a vertical conductor at their intersection. The bases of each of the thyristors 141 associated with the vertical input conductor 120-1 are connected via an isolation diode 142 to a common vertical control conductor 150-1 of a plurality of such conductors 150-1 through 150-n. A resistor 143 connected between vertical conductor 120-1 and the base of thyristor 141 increases the crosspoint protection against false turn-on due to transient voltages. The common control conductors 150-1 through 150-n connect all of the bases of the thyristors of their respective coordinates and extend to the network control of the telephone system with which this invention may be adapted for use.

The control conductors 150 conventionally comprise one of the set of selection coordinates of the mn network array. The other coordinate selection is accomplished by means of a plurality of current sources 160-1 through 160-m connected respectively to the output ends of the conductors 130-1 through 130-n. The sources 160 are selectively controlled via a plurality of conductors 161-1 through 161-m also extended to the network control. The sources 160 may comprise any controllable circuit means known in the art capable of providing the current level to be described such as the exemplary circuit shown in connection with the representative source 160-1. That circuit comprises a transistor 162 controlling, by means of its base, current from a source of positive potential 163. Since the network control circuitry need not be described for an understanding of the present invention and is in any event known in the art, it is referred to here only to the extent of the control function performed in an illustrative operation of the circuit organization of this invention. In accordance with one aspect of this invention, the mn array of network 100 performs a concentration of subscriber lines to ring-trip detection circuits; *m* may represent a number of lines several orders greater than the number of detectors *n* connected to the outputs of network 100, e.g., 1000 to 10 as in the example set forth earlier.

Returning to the subscriber line side of the bridge connecting the voltage dividers (resistors 412–413 and resistors 414–415), it is apparent that when the relay 210 closes its contacts 211 and 212, the subset 200 is transferred from the transmission network 220 to the ringing bus 410, a path to ground being thus conventionally provided for ringing current originating at source 400. When the hookswitch contacts 203 are closed by the called party response, such a path is also provided for direct current from the source 420, thereby adding a conducting path including only the subset resistance 205, parallel to the voltage divider resistors 412–413. The ringing relay 210 is operated by a signal applied to its energization circuit via a conductor 217 extended to the system common control upon identification of the called line. This condition will be assumed in describing a typical operation of a ring-trip detector circuit according to this invention. At the time of the identification of the system common control of the called line, an idle detector circuit 300 is assigned thereto by the system network control. It will be assumed for purposes of description that the detector circuit 300-1 is idle; accordingly, the network control establishes a connection thereto via an idle crosspoint of the network 100, such as the crosspoint 140'. This crosspoint is activated (thyristor 141 rendered conductive) by an appropriate control gating signal applied from the network control to the control conductor 150-1. This gating signal is also applied via the conductor 150-1 to each of the other crosspoints of the coordinate. The transmission path to the detector circuit 300-1 is completed through the network 100 by the selection of horizontal conductor 130-1. Concurrently with the activation of crosspoint 140', network control applies a selection signal to the base of transistor 162 via conductor 161-1 thereby causing the latter transistor to switch to its on state. A holding current is, as a result, generated in a circuit including the thyristor 141 causing it to remain conductive after termination of the gating control signal applied to its base, all as is known in the art. The remaining thyristors 140 in the same coordinate as the thyristor 141, not having their respective hold current sources 160 energized, return to the nonconductive state after termination of the gating control signal on the control conductor 150-1. A bridging path has thus been established from the tap of the voltage divider comprising resistors 412–413 to the tap of voltage divider comprising resistors 414–415 which may be traced as follows: from one end, network input conductor 120-1, crosspoint 140', network output conductor 130-1, conductor 317, low-pass filter 316, and one input of detector circuit 300-1; and, from the other end, conductor 416, low-pass filter 315, and the other input of detector circuit 300-1.

As previously noted, upon the closure of ringing relay 210 contacts 211 and 212, a path including the ringer 201 of the subscriber subset 200 is completed for the ringing current from the source 400. The ringing current is also applied to the parallely connected voltage dividers, the resistors 412–413 and 414–415 of which, when taken with the resistor 411, are chosen to maintain the indicated tap point A of one divider at a slightly more negative potential than tap point B of the other divider. This slightly more negative potential ensures that the transistor 320 side of detector circuit 300-1 remains normally conductive during the connection through network 100, the other transistor 310 remaining nonconductive as a result of the controlling less negative difference potential applied from tap point B via conductor 416. The filters 315 and 316 are provided to limit the swing of the alternating ringing current to prevent reverse biasing of detector circuit 300-1 to ensure normal conduction of transistor 320. The voltage dividers may advantageously be designed to limit the outputs at the taps to levels reasonably compatible with the limitations of thyristors 141 of network 100.

Closure of ringing relay 210 contacts 211 and 212, in addition to completing a ringing circuit for ringer 201 of subset 200, also prepares a circuit including normally open hookswitch contacts 203 which is seen to shunt the voltage divider including resistors 412–413. When the hookswitch contacts 203 are closed by the called party response, this shunt path including only the subset 200 resistance 205 provides a lower resistance path to ground for the ringing current and a path for direct current from the source 420. The voltage across resistor 205 drops, also reducing the negative voltage at tap point A below that of tap point B at the other end of the bridge. As a result, transistor 320 of detector circuit 300-1 is cut off and transistor 310 is rendered conductive. From its reference potential level when transistor 310 is non-conductive, the level of the alternating ringing current transmitted through network 100 now shifts towards ground as it appears on the detector input conductor 317. This shift, indicative of the off-hook state of subset 200, cuts off transistor 320 and renders transistor 310 conductive. The nonconductive state of transistor 320 is transmitted to a system scan-point via conductor 330-1 where, after suitable conversion, it is available to the system common control to initiate the retransfer of subset 200 to the transmission network 220 thereby cutting off the ringing current. This is accomplished by restoring ringing relay 210 and thereby, its contacts 214 and 215. At this time hold current source 160-1 is also deenergized under control of network control thereby restoring thyristor 141 of crosspoint 140' to its high impedance state. Detector circuit 300-1 is now available for assignment to another called line to repeat the above-described illustrative ring-trip operation.

What has been described is considered to be only one specific illustrative supervisory ring-trip detector arrangement according to the principles of this invention. It is to be understood that various and numerous other arrangements may be devised by one skilled in the art without departing from the spirit and scope of this invention. It will also be apparent to one skilled in the art that the circuit of this invention may be employed with equal advantage in contexts other than communications systems including solid state transmission networks, albeit presenting similar problems to which this invention is directed. Accordingly, the foregoing description is not considered limiting, the scope of this invention to be measured only by the accompanying claims.

What is claimed is:

1. A telephone system comprising a transmission network, a plurality of subscriber lines normally connected to respective input terminals of said network, each of said lines including a normally open hookswitch and a ringer circuit, a ringing current circuit for said lines including a source of direct current, a source of alternating ringing current, and a plurality of first voltage dividers associated respectively with said lines; a plurality of relay means individually associated with said lines for disconnecting a selected line of said plurality of lines from said transmission network and for connecting said selected line to a first tap on its associated voltage divider for applying said ringing current to the ringer circuit of said selected line when said selected line is called, and ring trip detection circuit means for detecting a closed hookswitch condition on said selected line comprising a plurality of direct current detection circuits, a plurality of second voltage divider circuits included in said ringing current circuit associated respectively with said detection circuits, and an auxiliary network having a plurality of input terminals connected respectively to second taps on said first voltage dividers and a plurality of output terminals connected respectively to said plurality of detection circuits, said auxiliary network being operable responsive to the determination of an idle one of said detection circuits to complete a bridge path including said idle detection circuit between a second tap of said first voltage divider associated with said selected line and a tap on said second voltage divider associated with said idle detection circuit.

2. A telephone system as claimed in claim 1 in which said lines are coupled to said transmission network by means of transformers effectively blocking direct current from said last-mentioned network.

3. A telephone system as claimed in claim 2 in which said auxiliary network comprises a coordinate array of solid state crosspoint devices.

4. A telephone system as claimed in claim 3 in which said plurality of subscriber lines are greater in number than said plurality of detection circuits.

5. A telephone system having a common control comprising a plurality of subscriber lines, each including a normally open hookswitch, a transmission network, a common ringing circuit including a direct current source for said subscriber lines, switch means individual to each of said lines operated under control of said common control for switching connections of a selected one of said lines between said network and said ringing circuit, means for detecting a closed hookswitch condition in said selected line comprising first circuit means including said common ringing circuit, a first conducting path connected to said common ringing circuit including a first voltage divider, a second conducting path connected to said common ringing circuit including a second voltage divider, a plurality of voltage level detector means each having a first and a second input, an auxiliary network having a plurality of conducting paths connectable therethrough, one of said last-mentioned paths connecting a tap of said first voltage divider and the first input of a selected one of said voltage level detector means, and second circuit means for connecting a tap of said second voltage divider and the second input of said selected one of said voltage level detector means, said switch means serially connecting the hookswitch of said selected line in said circuit means parallel to said voltage dividers when switching a connection of said last-mentioned line from said transmission network to said ringing circuit.

6. A telephone system having a common control comprising a plurality of subscriber lines, each including a normally open hookswitch, a transmission network, a common ringing circuit including a direct current source for said subscriber lines, switch means individual to each of said lines operated under control of said common control for switching connections of a selected one of said lines between said network and said ringing circuit, means for detecting a closed hookswitch condition in said selected line comprising a plurality of voltage level detector means each having a first and a second input, an auxiliary network having a plurality of conducting paths selectively connectable therethrough, circuit means including said common ringing circuit and having a first and a second parallel branch connected to said common ringing circuit and including, respectively, a first and a second voltage divider, and a bridging circuit connected between taps of said first and second voltage dividers, said bridging circuit including a selected one of said auxiliary network conducting paths connected at one end to the tap of said first voltage divider and connected at the other end to the first input of a selected one of said voltage level detector means, said bridging circuit further including circuit means for connecting the second input of said selected one of said voltage level detector means to the tap of said second voltage divider, said switch means connecting the hookswitch of said selected line across said first voltage divider when switching the connection of said last-mentioned line from said transmission network to said ringing circuit.

7. A telephone system as claimed in claim 6 in which each of said voltage level detector means comprises a comparator circuit for comparing the voltage levels at the taps of said first and second voltage dividers.

8. A telephone system as claimed in claim 7 in which a connection of said selected subscriber line and said transmission network transmits alternating current signals exclusively.

9. A telephone system as claimed in claim 6 in which each of said voltage level detector means comprises a comparator circuit for comparing the voltage levels at the taps of respective first and second voltage dividers and for generating an output signal when said voltage levels differ by a predetermined magnitude.

10. In a telephone system having a transformer coupled transmission network, in combination, a plurality of subscriber lines normally connected to transformer terminals of said network, each of said lines terminating in a normally open hookswitch and a ringer circuit, a ringing circuit for said lines including a direct current source and an alternating ringing current source, individual relay switch means for each of said lines for disconnecting an associated line from said network and for connecting said associated line to said ringing circuit when said line is called to provide a ringing current path including the ringer circuit of said line and a direct current path when the hookswitch of said line is closed, and a ring-trip detection circuit means comprising an individual first voltage divider associated with each of said lines connected to said ringing circuit parallel to a line, said divider having a tap for providing a first output voltage when the hookswitch of the associated line is open and a second output voltage when the hookswitch of the associated line is closed, a plurality of voltage level detector means each having a first and a second input, an auxiliary network having a plurality of input terminals connected respectively to the taps of said individual first voltage dividers and having a plurality of output terminals connected respectively to said first inputs of said plurality of voltage level detector means, said auxiliary network establishing a connection between the tap of a first voltage divider associated with a called line and a first input of a voltage level detector means when said last-mentioned detector means is determined as idle for applying said first and second output voltages to said last-mentioned first input, an individual second voltage divider associated with each of said plurality of voltage level detector means connected to said ringing circuit also parallel to a subscriber line, said divider having a tap for providing a reference output voltage, and means for connecting respectively the taps of said second voltage dividers and the second inputs of said voltage level detector means.

11. In a telephone system having a transformer-coupled transmission network, the combination as claimed in claim 10 in which said plurality of subscriber lines are greater in number than said plurality of voltage level detector means.

12. In a telephone system having a transformer-coupled transmission network, the combination as claimed in claim 11 in which each of said voltage level detector means comprises a comparator circuit means for comparing the voltage levels at said respective taps of said first and second voltage dividers when said hookswitch of a called subscriber line is closed.

* * * * *